(12) United States Patent
Schwarzbich

(10) Patent No.: US 6,585,447 B2
(45) Date of Patent: Jul. 1, 2003

(54) DEVICE FOR CONNECTING STRUCTURAL COMPONENTS

(76) Inventor: Jörg Schwarzbich, Wertherstrasse 15, Bielefeld (DE), D-33615

( * ) Notice: Subject to any disclaimer, the term of this patent is extended or adjusted under 35 U.S.C. 154(b) by 0 days.

(21) Appl. No.: 10/066,082

(22) Filed: Dec. 13, 2001

(65) Prior Publication Data

US 2002/0076269 A1 Jun. 20, 2002

(30) Foreign Application Priority Data

Dec. 14, 2000 (DE) .................... 200 21 194 U

(51) Int. Cl.⁷ .............. F16B 43/00; F16B 43/02
(52) U.S. Cl. ............ 403/374.3; 403/299; 411/546; 411/535
(58) Field of Search ............... 411/546, 535; 403/373, 374.1, 374.2, 374.3, 299

(56) References Cited

U.S. PATENT DOCUMENTS

| 3,014,563 A | 12/1961 | Bratton |
| 3,332,182 A | 7/1967 | Mark |
| 4,373,309 A | 2/1983 | Lutz |
| 4,682,906 A | 7/1987 | Rückert et al. |
| 4,934,861 A | 6/1990 | Weeks et al. |
| 5,271,700 A | 12/1993 | Le Goff |
| 5,288,191 A | 2/1994 | Rückert et al. |
| 5,340,258 A | 8/1994 | Simon |
| 5,492,388 A * | 2/1996 | Kawasaki .............. 411/535 X |
| 6,062,791 A * | 5/2000 | Simon ................. 411/535 |
| 6,327,829 B1 | 12/2001 | Taguchi |

FOREIGN PATENT DOCUMENTS

| DE | 19839710 | 3/2000 |
| EP | 0176663 | 4/1986 |
| EP | 0543046 | 5/1993 |
| EP | 0955479 | 11/1999 |
| FR | 2691513 | 11/1993 |

* cited by examiner

Primary Examiner—Lynne H. Browne
Assistant Examiner—John R. Cottingham
(74) Attorney, Agent, or Firm—Richard M. Goldberg

(57) ABSTRACT

A device for connecting two structural components, includes a base part disposed at one structural component, a spacer having a threaded portion in threaded engagement with the base part, the spacer being supported with one end thereof at the other structural component, a connecting screw inserted frictionally engaged through the spacer, a shoulder formed at one end of the threaded portion of the spacer, and an abutment to be engaged by the shoulder and being formed at the base part, such that the abutment is arranged to become effective to limit, through engagement with the shoulder, a threading movement of the spacer in one direction relative to the base part only after the base part and the spacer have been assembled.

5 Claims, 2 Drawing Sheets

DEVICE FOR CONNECTING STRUCTURAL COMPONENTS

BACKGROUND OF THE INVENTION

The invention relates to a device for connecting structural components, comprising a base part attached to one of said components, a spacer which is in-threaded engagement with the base part and has an end supported at the other structural component, and a connecting screw which is inserted frictionally engaged through the spacer.

A known device of this type is described in U.S. Pat. No. 4,682,906 and is used to connect two structural components, which are disposed at a particular distance from one another, with the help of the connecting screw, without distorting the structural components as the connecting screw is tightened. The connecting screw is inserted, for example, through the structural component, which is to be supported at the spacer, and is then screwed into an internal thread of the other structural component which is connected with the base part. During this screwing-in motion, the spacer is taken along by friction. The thread between the spacer and the base part is a left-handed thread, so that the spacer is screwed further out of the base part and approaches the structural component, which is held by the head of the connecting screw, until this component finally lies in contact with the front surface of the spacer.

However, if the distance between the structural components which are to be connected is greater than the maximum adjusting path of the spacer, it may happen that, as the connecting screw is screwed in, the spacer is screwed completely out of the base part. Since the spacer in this case is accessible only with difficulty, if at all, it is difficult to restore the threaded engagement between the spacer and the base part.

In the state of the connecting device as delivered, the spacer normally is screwed completely into the base part. From practice, a connecting device is known, in which the spacer in this position is in contact with a stop and, in addition is held in position by a resilient tab. It must however be possible to overcome the resistance of this tab when the connecting screw is screwed in. Accordingly, it cannot be excluded that, because of improper handling or jarring, the spacer, before use of the connecting device, becomes detached completely from the base part, so that the parts of the connecting device fall apart and are lost. Another embodiment of a connecting device of this type is disclosed in applicant's co-pending U.S. patent application Ser. No. 09/920,201.

SUMMARY OF THE INVENTION

It is an object of the invention to provide a device of the type indicated above, in which the spacer and the base part are held together so as to be prevented from getting lost.

According to the invention, this object is achieved by the fact that the movement of the spacer relative to the base part in one direction is limited by a shoulder that is formed at an end of the threaded portion of the spacer and engages an abutment at the base part, which abutment becomes effective only after the spacer and the base part have been assembled.

Thus, in the device according to the invention, it is possible that the spacer is initially screwed into the base part and then the abutment is made effective, so that the spacer can no longer be screwed out of the base part completely. If necessary, the movement of the spacer relative to the base part in the other direction may be limited by normal stops, so that it is possible, neither, to screw the spacer completely through the base part. In this way, the spacer and the base part, once assembled, are held together so that they may not get lost.

In one embodiment, the abutment, which becomes effective only after assembly, is formed by a spring member which projects radially inward from the base part, for example a spring member in the form of a resilient tab which retreats, when the spacer is screwed in, and which then locks behind the shoulder of the spacer.

In another embodiment, the abutment is rigidly provided on a jacket into which a threaded sleeve is press-fitted. In this embodiment, the spacer is at first screwed into the threaded sleeve, and only then is the threaded sleeve pressed into the jacket of the base part, so that the abutment is made effective.

BRIEF DESCRIPTION OF THE DRAWINGS

In the following, embodiment examples of the invention are explained in conjunction with the drawings, in which.

DETAILED DESCRIPTION

Figure 1:
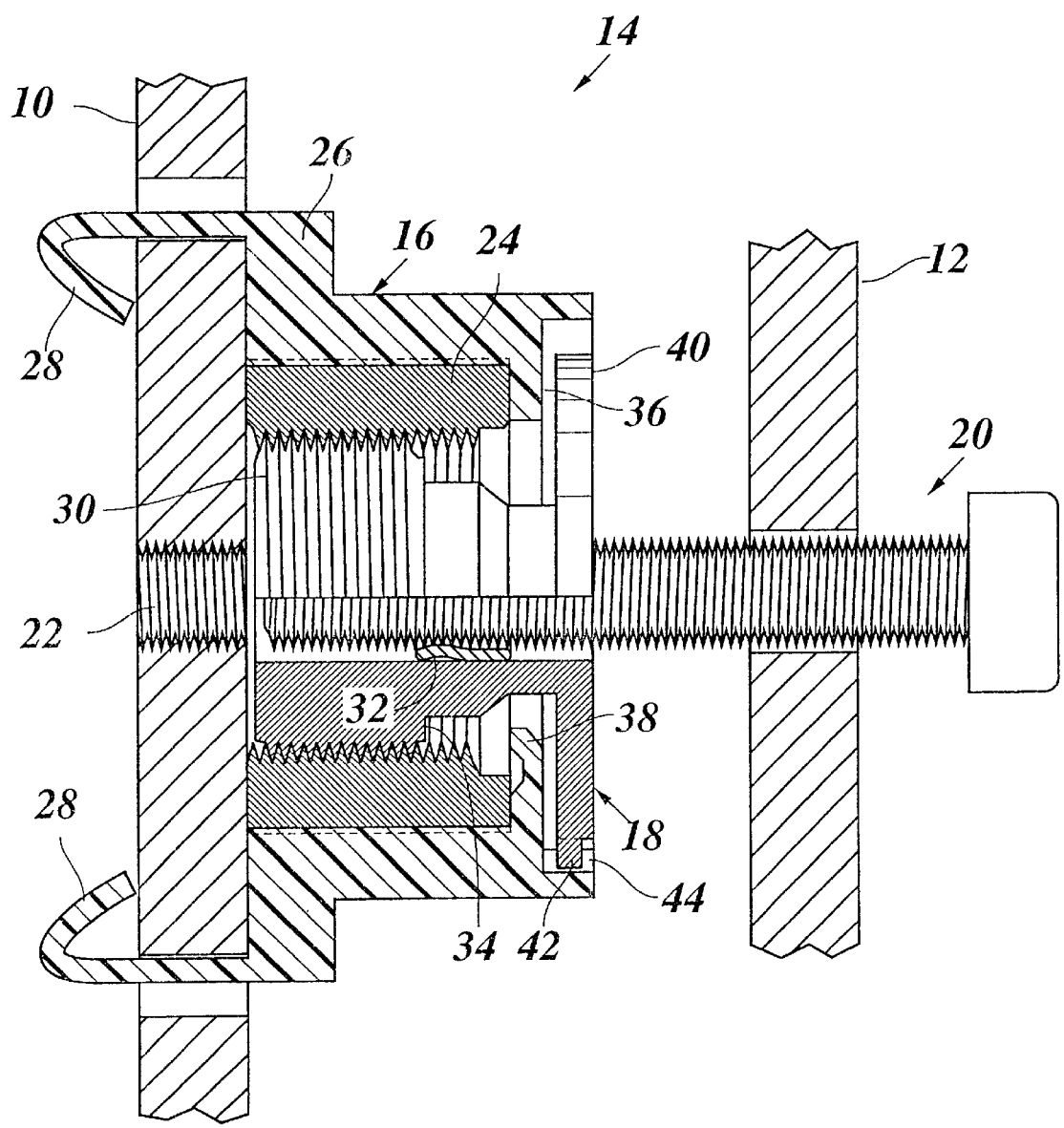
FIG. 1 shows an axial section through a connecting device and two structural components to be connected.

In FIG. 1, two plate-like structural components 10, 12 are shown, which are to be connected to one another at a distance from one another by a connecting device 14. The connecting device 14 is formed by a base part 16 which is held at the structural component 10, a spacer 18 that is screwed into the base part 16, and a connecting screw 20 which is inserted through the structural component 12 and into a central bore of the spacer 18 and, during the establishment of the connection, is screwed into a threaded bore 22 of the structural component 10.

The base part 16 has a threaded metal sleeve 24 which is supported at the component part 10 and has a knurled outer periphery onto which a plastic jacket 26 is pressed. The jacket 26 forms two claws 28 with which the base part 16 is non-rotationally clipped to the component part 10.

The spacer 18 is made of metal in its entirety. The threaded sleeve 24 of the base part and the spacer 18 are in threaded engagement with one another through a left-handed thread 30. A spring collar 32 is pressed into a central bore of the spacer 18 and is in frictional engagement with the external thread of the connecting screw 20.

When the connecting screw 20 is screwed into the threaded bore 22 of the component part 10, the spacer 18 is rotationally entrained, whereas the base part 16 is held non-rotatable by the claws 28. Because of the left-handed thread, the spacer 18 is therefore screwed out of the base part 16, so that it approaches the component part 12 which in turn is pressed against the spacer by the head of the connecting screw 20.

The left-handed thread 30 of the spacer 18 is limited at one end thereof, on the right side in FIG. 1, by a shoulder 34. The inner peripheral surface of the jacket 26 is formed with an annular collar 36 at which one end of the threaded sleeve 24 is supported. A resilient tab 38 projects inwardly from the collar 36 at at least one location of the periphery of the latter. This tab 38 forms an abutment which cooperates with the shoulder 34 and thereby limits the maximum expansion stroke of the spacer 18.

The spacer 18 has, at its end facing the component part 12, a radially projecting flange 40 which provides an engagement surface for the component part 12 when the component parts 10 and 12 are clamped together by the connecting screw 20. In the condition shown in FIG. 1, in which the spacer 18 is still completely accommodated within the base part 16, the outer end face of the flange 40 is flush with the end face of the base part 16. A projection 42 which radially projects from the edge of the flange 40 engages an inwardly projecting stop 44 of the base part. The stop 44 thus prevents the spacer 18 from being rotated in the counterclock sense, as seen in the direction in which the connecting screw 20 is screwed in. Consequently, the spacer 18 cannot be displaced towards the component part 10 beyond the position shown in FIG. 1. When, however, the connecting screw 20 is screwed in clockwise direction into the threaded sleeve 24, the spacer 18 can co-rotate in the clock sense, because the projection 42 is then lifted from the stop 44. After one complete turn of the spacer 18, the projection 32 has moved already out of the base part 16 to such an extent that it can now move past the stop 44 of the base part.

It is thus assured in the shown embodiment that the spacer 18 cannot be screwed out of and removed from the base part 16, neither in the one direction nor in the other.

When the connecting device is being assembled, the spacer 18 can however be screwed into the threaded sleeve 24 of the base part from the right end in FIG. 1. Then, the elastic tab 38 is at first bent inwardly, so that it retreats from the spacer 18. When the spacer is screwed-in further, the tab 38 slips over the external thread of the spacer, and it finally slips over the shoulder 34, so that it returns elastically into its original position in which it acts as an abutment for the shoulder 34.

Figure 2:
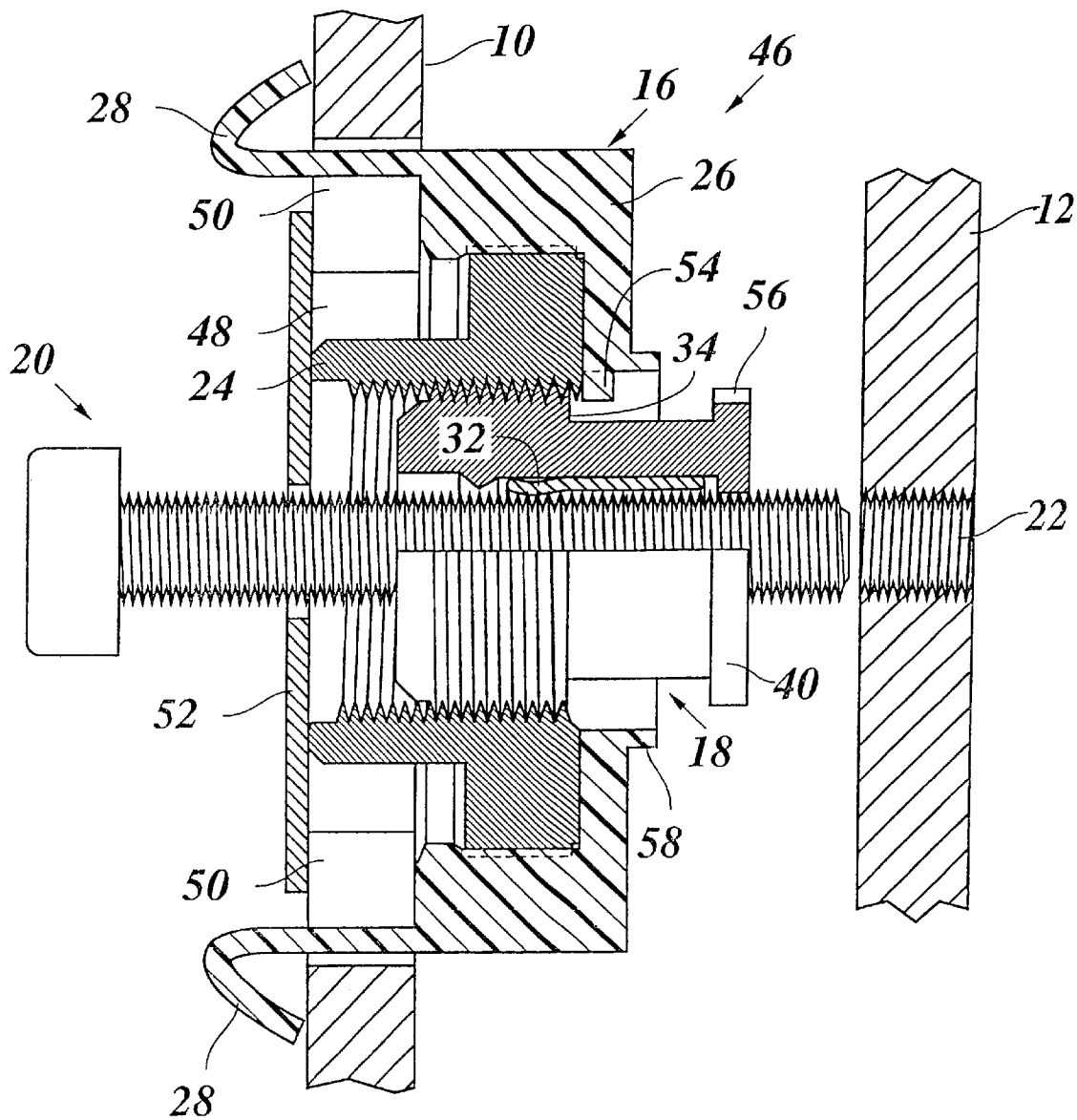
FIG. 2 shows a connecting device according to another embodiment.
Figure 3:
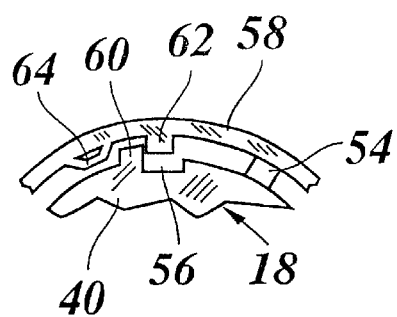
FIG. 3 shows a part of the connecting device of FIG. 2 in a front view.

FIGS. 2 and 3 show, as another example, a connecting device 46 in which the connecting screw 20 is screwed-in from the opposite end. In this case, the component part 10 has an opening 48 shaped like a key hole and having two diametrically opposed extensions 50 for receiving the claws 28. The circular inner part of the opening 48 is covered by a disk 52 at which the head of the connecting screw 20 and the threaded sleeve 24 of the base part 16 are supported.

The threaded sleeve 24 and the spacer 18 have in this case right-handed threads, so that the spacer 18 is extended towards the component part 12, to the right in FIG. 2, when the connecting screw 20 is turned clockwise.

FIG. 2 shows the spacer 18 already in the extended condition, in which the shoulder 34 has almost reached the abutment position. However, the abutment at the jacket 26 is in this case not formed by a resilient tab but by a rigid projection 54. The flange 40, which is formed at the spacer 18 and which, in this case, has a smaller diameter, has, at one location of its periphery, a recess 56 through which the projection 54 may pass in axial direction.

When the connecting device 46 is assembled, the threaded sleeve 24 and the spacer are first screwed together, before the threaded sleeve 24 is pressed into the jacket 26. As a result, the spacer 18 can be screwed into the threaded sleeve 24 from the right side in FIG. 2, until it has approximately reached the screwed-in position shown in FIG. 2. Then, the spacer 18 and the threaded sleeve 24 are, together, inserted into the jacket 26 from the left side in FIG. 2. At this instant, the spacer 18 is held in an angular position in which the projection 54 can pass through the recess 56. In a final phase of the insertion movement, the threaded sleeve 24 is then pressed into the jacket 26 with its knurled outer periphery. Finally, the spacer 18 is screwed deeper into the threaded sleeve 24, until its opposite end faces are flush with the corresponding end faces of the base part 16. In this condition, in which the connecting device has its smallest possible axial dimension, the base part 16 is then clipped to the component part 10, and the connecting screw 20 is inserted and screwed-in, so that the spacer 18 is extended again.

FIG. 3 shows a part of the end face of the flange 40 as well as part of a boss 58 which is formed at the jacket 26 and surrounds the flange 40. In the condition shown in FIG. 3, the recess 56 formed in the periphery of the flange 40 is angularly displaced from the projection 54 of the base part. Adjacent to the left flank, as seen in FIG. 3, of the recess 56, there is formed a projection 60 which projects radially outwardly from the edge of the flange 40. An inwardly projecting stop 62 and a bridge-shaped retaining spring 64 are molded to the internal peripheral surface of the boss 58. As long as the flange 40 is in an axial position outside of the base part, as in FIG. 2, the spacer 18 can be rotated clockwise and hence be screwed deeper into the base part 16. During the last turn, immediately before the smallest axial dimension is reached, the flange 40 enters into the boss 58. The projection 60 slips at first over the retaining spring 64, while overcoming a certain retaining resistance, and then abuts at the stop 62. In this way, the spacer 18 is prevented from being screwed-in further. The retaining spring 64 retains the spacer in the then-reached position, which corresponds to the smallest axial dimension, and prevents the spacer from being misadjusted due to vibrations. However, the force of the retaining spring 64 is dimensioned such that it can be overcome by the frictional coupling between the connecting screw 20 and the spacer, when the connecting screw 20 is screwed in. During this operation of screwing-in the connecting screw, the spacer 18 turns left in the view shown in FIG. 3, so that the projection 60 moves away from the stop 62.

What is claimed is:

1. A device for connecting two structural components, comprising:

a base part disposed at one structural component, said base part having a threaded sleeve made of metal and a jacket of plastic, a spacer having a threaded portion in threaded engagement with the base part, said spacer being supported with one end thereof at the other structural component, a connecting screw inserted frictionally engaged through the spacer, a shoulder formed at one end of said threaded portion of the spacer, and an abutment to be engaged by said shoulder and being formed at the base part, said abutment being formed by a spring member which retreats when the spacer is screwed into the base part, and which then locks behind said shoulder, and said spring member is formed at said jacket, wherein said abutment is arranged to become effective to limit, through engagement with said shoulder, a threading movement of the spacer in one direction relative to the base part only after the base part and the spacer have been assembled.

2. A device for connecting two structural components, comprising:

a base part disposed at one structural component, the base part comprising a threaded sleeve made of metal and a plastic jacket, the threaded sleeve being press-fitted in said jacket, a spacer having a threaded portion in threaded engagement with the base part, said spacer being supported with one end thereof at the other structural component, a connecting screw inserted frictionally engaged through the spacer, a shoulder formed at one end of said threaded portion of the spacer, and an abutment to be engaged by said shoulder and being formed at the base part, and said abutment is formed rigidly at the jacket, wherein said abutment is arranged to become effective to limit, through engagement with said shoulder, a threading movement of the spacer in one direction relative to the base part only after the base part and the spacer have been assembled.

3. The device of claim 1, wherein the spacer has an end adjacent to said shoulder and, at this end, a radially projecting flange and a projection extending from said flange, and the base part has a stop defining an end position for the spacer, and wherein, when the spacer reaches said end position, the projection engages the stop and thereby limits a further rotary threading movement of the spacer relative to the base part.

4. The device of claim 2, wherein the spacer has an end adjacent to said shoulder and, at this end, a radially projecting flange and a projection extending from said flange, and the base part has a stop defining an end position for the spacer, and wherein, when the spacer reaches said end position, the projection engages the stop and thereby limits a further rotary threading movement of the spacer relative to the base part.

5. The device of claim 4, wherein a recess, which is complementary to said abutment of the base part, is formed in an outer periphery of said radially projecting flange.

\* \* \* \* \*